United States Patent
Vieira Lopes

(10) Patent No.: US 9,695,587 B2
(45) Date of Patent: Jul. 4, 2017

(54) AUTOMATED STRUCTURE FOR RECEPTION OF MODULAR CONSTRUCTIONS, AUTOMATION SYSTEM AND OPERATING METHOD THEREOF

(71) Applicant: Manuel Vieira Lopes, Valongo (PT)

(72) Inventor: Manuel Vieira Lopes, Valongo (PT)

(*) Notice: Subject to any disclaimer, the term of this patent is extended or adjusted under 35 U.S.C. 154(b) by 0 days.

(21) Appl. No.: 14/423,923

(22) PCT Filed: Sep. 2, 2013

(86) PCT No.: PCT/IB2013/058227
§ 371 (c)(1),
(2) Date: Feb. 25, 2015

(87) PCT Pub. No.: WO2014/033691
PCT Pub. Date: Mar. 6, 2014

(65) Prior Publication Data
US 2015/0252559 A1   Sep. 10, 2015

(30) Foreign Application Priority Data
Aug. 31, 2012   (PT) .......................................... 106514

(51) Int. Cl.
*E04B 1/344*   (2006.01)
*E04B 1/343*   (2006.01)
(Continued)

(52) U.S. Cl.
CPC .............. *E04B 1/344* (2013.01); *E04B 1/346* (2013.01); *E04B 1/34357* (2013.01);
(Continued)

(58) Field of Classification Search
CPC .............. F24J 2/0007; F24J 2002/5493; E04B 1/34357; E04B 1/346; E04B 7/163; Y02E 10/47
(Continued)

(56) References Cited

U.S. PATENT DOCUMENTS 4,172,442 A * 10/1979 Boblitz ................. F24J 2/0477
126/400
4,178,913 A * 12/1979 Hutchison ................. F24J 2/14
126/601
(Continued)

FOREIGN PATENT DOCUMENTS

CN           201202178 Y      3/2009
DE             2443029 A1     3/1976
(Continued)

*Primary Examiner* — Brian Glessner
*Assistant Examiner* — Adam Barlow
(74) *Attorney, Agent, or Firm* — Lucas & Mercanti, LLP

(57) ABSTRACT

The present application describes an automated structure for reception of modular constructions and respective automation system comprised by a lower structure (1), which contains an opening (4) for accommodation of a fixed shaft, comprised by the element of attachment of the shaft with the exterior, where, preferably, the structure and the fixed shaft of fixation to the exterior (5) can be coupled, a lifting mechanism (2) preferably located in the side sections of said lower structure (1) which is coupled to an upper structure (3) allowing its movement through the joint and support (6). The axial movement and the upper structure (3) are managed through an automated system based on a programmable automaton and a set of sensors and actuators, namely anemometers and frequency inverters that control these movements. This way, the present invention makes it possible to receive modular constructions, for example houses, making them move, for example, according to the solar orientation, in order to make them energy efficient.

9 Claims, 12 Drawing Sheets

(51) Int. Cl.
  *E04B 1/346*  (2006.01)
  *F24J 2/54*   (2006.01)
  *F24J 2/00*   (2014.01)
  *E04B 7/16*   (2006.01)

(52) U.S. Cl.
  CPC ............ *E04B 7/163* (2013.01); *F24J 2/0007* (2013.01); *F24J 2/542* (2013.01); *F24J 2002/5493* (2013.01); *Y02B 10/20* (2013.01); *Y02E 10/47* (2013.01)

(58) Field of Classification Search
  USPC ....................................................... 52/1, 66
  See application file for complete search history.

(56) References Cited

U.S. PATENT DOCUMENTS

| | | | | |
|---|---|---|---|---|
| 4,332,238 A * | 6/1982 | Garcia, Jr. | ................. | F24J 2/12 |
| | | | | 126/578 |
| 4,508,426 A * | 4/1985 | Hutchison | .............. | F24J 2/4607 |
| | | | | 126/570 |
| 4,890,599 A * | 1/1990 | Eiden | ........................ | F24J 2/542 |
| | | | | 126/602 |
| 5,191,875 A | 3/1993 | Edling et al. | | |
| 6,005,236 A * | 12/1999 | Phelan | ........................ | F24J 2/38 |
| | | | | 126/600 |
| 2012/0193512 A1 * | 8/2012 | Wu | ............................ | F24J 2/38 |
| | | | | 250/203.4 |

FOREIGN PATENT DOCUMENTS

| GB | | 440 904 A | | 1/1936 | | |
|---|---|---|---|---|---|---|
| IL | WO | 2010067370 A2 * | | 6/2010 | ............. | F24J 2/1047 |
| WO | | 2010067370 A2 | | 6/2010 | | |

* cited by examiner

AUTOMATED STRUCTURE FOR RECEPTION OF MODULAR CONSTRUCTIONS, AUTOMATION SYSTEM AND OPERATING METHOD THEREOF

CROSS REFERENCE TO RELATED APPLICATION

This Application is a 371 of PCT/IB2013/058227 filed on Sep. 2, 2013 which, in turn, claimed the priority of Portuguese Patent Application No. 106514 filed on Aug. 31, 2012, both applications are incorporated herein by reference.

TECHNICAL FIELD

The present application describes an automated structure for reception of modular constructions, automation system and method of operation thereof.

BACKGROUND

It is known from the state of the art the existence of parts of the structure of buildings that are mobile, such as the case of the document CN201202178Y that discloses an automated building-deposit of automobiles, comprising a main body structure, a ceiling, a side wall with doors and an automatic control mechanism for narrowing/widening, wherein the side wall includes a movable side wall, the mechanism of which allows the extension of the roof and movable side wall.

Thus, this document discloses the structure of a building that performs the narrowing/widening of a side wall in a horizontal direction, and the lowering of the ceiling to configure a folding structure in order to reduce the space when said structure is not used. However, this document does not present or disclose clues about the solution presented in this application, where the structure allows the movement of the entire modular construction in order to maximize or reduce exposure to the sun.

SUMMARY

It is an object of the present application to describe an automated structure for reception of modular constructions comprising:
- a lower structure (1), which contains an opening (4) for accommodation of a fixed shaft, comprised by the element of attachment of the shaft with the exterior (11);
- a lifting mechanism (2) located in the side sections of said lower structure (1) or on the cover of the modular constructions, which is coupled to an upper structure (3) through the joint and support (6).

Preferably, the structure (45) and the fixed shaft for attachment to the exterior (5) may be coupled to the element of attachment of the shaft with the exterior (11).

Said coupling can be carried out by means of the lifting mechanism (2), the lower bearing (7) the upper bearing (8), lower latch (9) upper latch (10), support bars of the lifting mechanism (35) and support piece (36).

In a preferred embodiment, the automated structure for reception of modular constructions is connected to a set of sensors and actuators.

In yet another preferred embodiment, the automated structure for reception of modular constructions comprises a rotation motor (28) and a drive motor of the upper structure (14) as well as the motors (32 and 33) placed on the lower (9) and upper (10) latches and a set of limit switches of protection in particular the upper (8) and lower (7) bearings.

In a preferred embodiment, the automated structure for reception of modular constructions has an upper structure (3) made in lattice format.

It is still an object of the present invention to describe an automation system connected to the automated structure comprising a programmable automaton and a set of sensors and actuators that control the movements of the structure.

In a preferred embodiment, the automation system presents a set of sensors and actuators comprising anemometers and frequency inverters.

In yet another preferred embodiment, the automation system presents three modes of operation: automatic, manual and maintenance.

In a preferred embodiment, the automation system carries out the collection of the upper structure (3) and closing of all latches (8 and 9) through action on the motors (14, 32 and 33) when the anemometer measures the wind speed above a predetermined value.

It is still an object of the present invention to describe a method of operation of the automated structure in conjunction with the automation system wherein the lower structure (1) contains an opening (4) for accommodation of a fixed shaft, comprised by the element of attachment of the shaft with the exterior (11), where the structure (45) and the fixed shaft for attachment to the exterior (5) can be coupled, whereto in turn is coupled preferably the rotating mechanism (27) or other similar, and that, by action of the motor of the rotation mechanism (28) on the drive sprocket (29) and the pinions (30), by means of a chain leading to the axial movement of the whole structure up to at least a radius of 180°.

In a preferred embodiment, the method of operation presents a lower structure (1) in its axial movement aided by the guiding wheels of the shaft (12) and by the set of supporting wheels of the lower structure (13).

In yet another preferred embodiment, the method of operation presents a set of supporting wheels of the lower structure (13) arranged in a circle around the entire fixed shaft (5) that moves in a trough placed on the ground.

In a preferred embodiment, the method of operation presents an upper structure (3) in its summer movement from the opening position and, making use of the automation system, controls the electric motor that operates the upper structure (14) which drives the spindle (16) and, by means of the nut (15) and connecting rods (19), raises the structure (3) as they are attached thereto and, at the same time, activates the electric motor that operates the lower latch (32) which, in turn, will activate the latching pin of the lower latch (31) keeping the upper latch (10) locked.

In still another preferred embodiment, the method of operation presents an upper structure (3) wherein in its winter movement differs from the summer movement in that the automation system unlocks the upper latch (10) by activating the electric motor that operates the upper latch (33) which activates the latching pin of the upper latch (34) keeping the lower latch (9) locked.

DESCRIPTION OF THE DRAWINGS

For an easier understanding of the invention there are attached figures which represent the preferred embodiments of the invention that, however, are not intended to limit the scope of the present invention.

DETAILED DESCRIPTION

Figure 1:
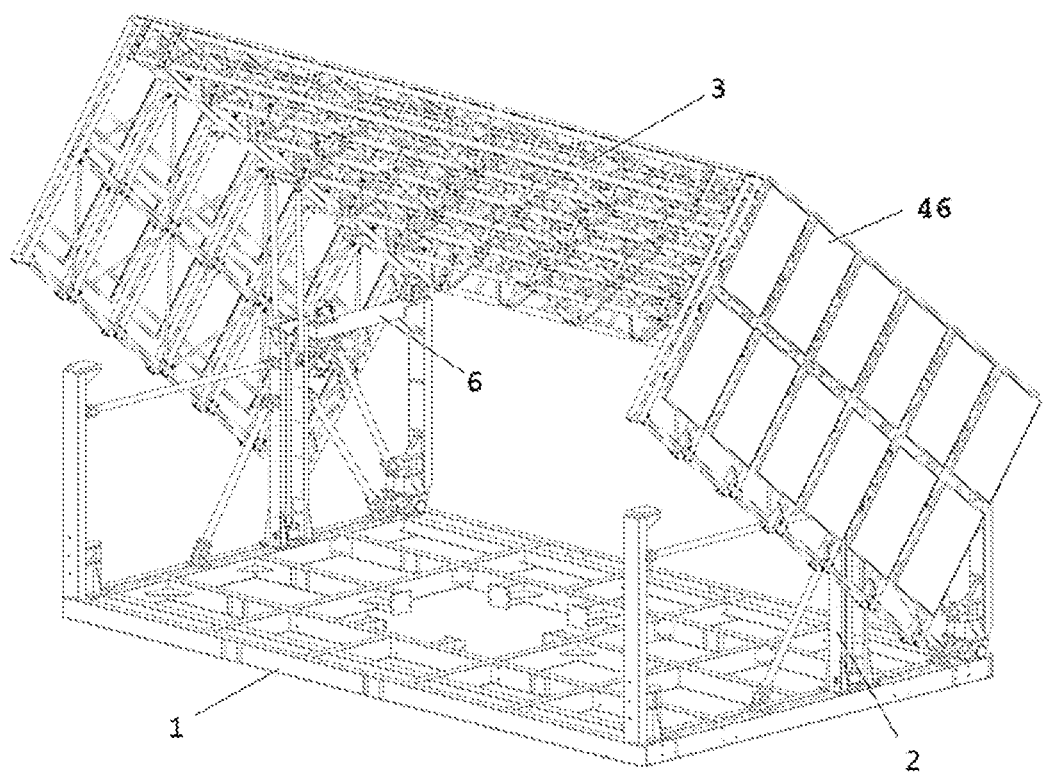
FIG. 1: Schematic representation of the structure with opening of the upper structure in the winter movement, wherein the following reference numbers represent:
1—lower structure;
2—lifting mechanism;
3—upper structure;
6—joint and support;
46—side sections of the upper structure.

The present invention describes an automated structure for reception of modular constructions, automation system and method of operation thereof and operating method, wherein the structure comprises a lower structure (1) which contains an opening (4) for accommodation of a fixed shaft, comprised by the element of attachment of the shaft with the exterior (11), where, preferably, a lifting mechanism may be coupled to the structure (45) and the fixed shaft for attachment to the exterior (5) located, preferably, on the side sections of said lower structure (1) and may also be located on the cover of the modular constructions, which is coupled to an upper structure (3) with joint and support (6), by means of the lifting mechanism (2) of the lower bearing (7), of the upper bearing (8), of the lower latch (9), of the upper latch (10), of the support bars of the lifting mechanism (35) and of the support piece (36) and which allows the movement of said upper structure (3). The axial movement and the upper structure (3) are managed through an automated system based on a programmable automaton and a set of sensors and actuators, namely anemometers and frequency inverters that control these movements. Thus, the present invention allows to receive on said lower structure (1) through the element of attachment of the shaft with the exterior (11) where it can be coupled to the structure (45) being accomplished the fixation to the exterior, modular constructions, for example houses, making them to move, for example, according to the solar orientation, in order to make them energy efficient. Additionally, a structure (45) can be coupled to said element of attachment of the shaft with the exterior (11), which remains fixed regardless of whether or not there is a rotation movement, fixation to the exterior being achieved through the fixed shaft (5) in that the structure will remain likewise fixed and will be introduced into the modular construction where it will be placed. In this way, it is possible to create different spaces in the interior of the aforementioned modular construction, also of different dimensions, as the rotation movement takes place.

Figure 10:
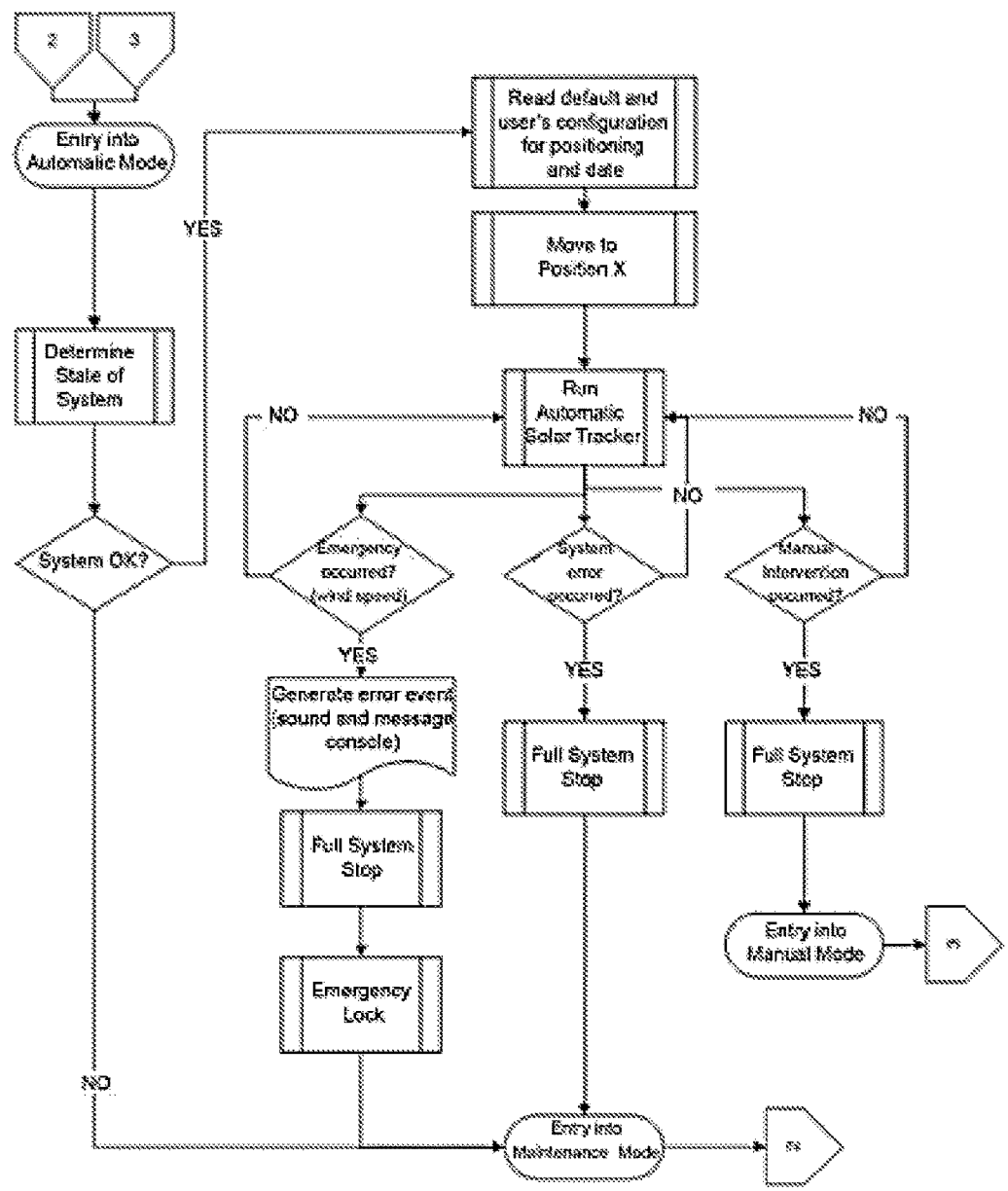
FIG. 10: Schematic representation of part of the operation of the automation system in automatic mode.
Figure 11:
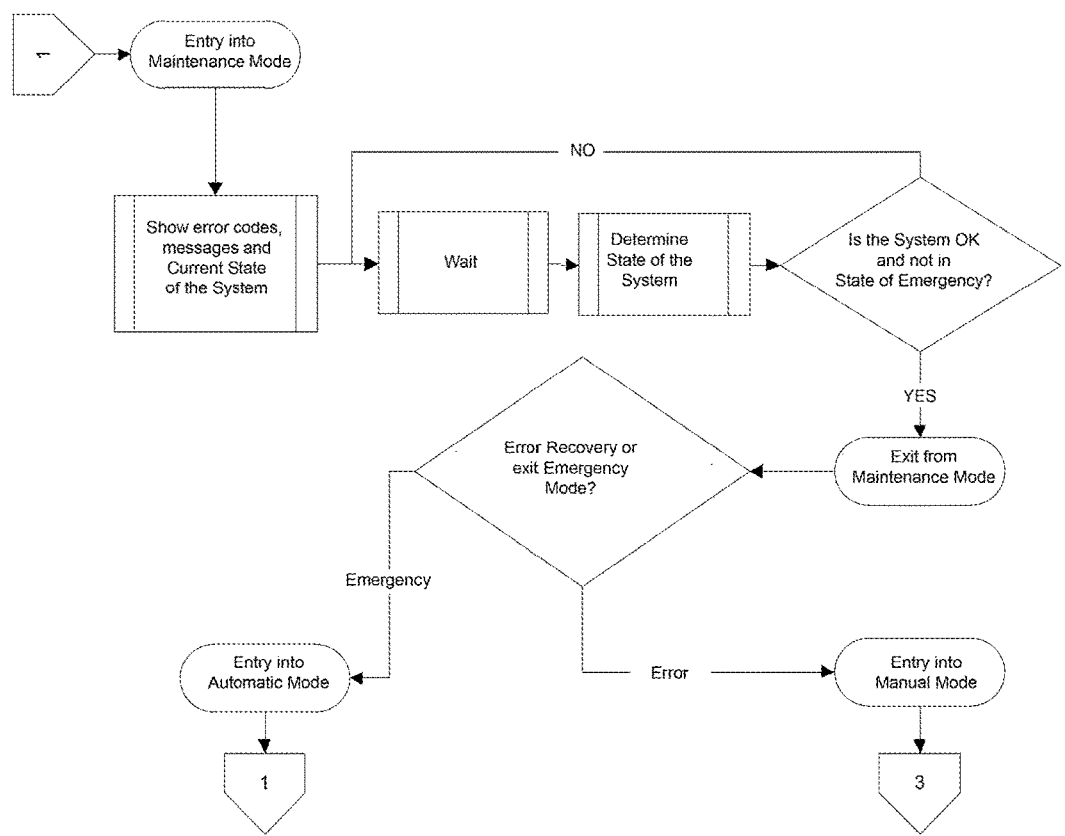
FIG. 11: Detail of the schematic representation of the operation of the automation system in maintenance mode.
Figure 12:
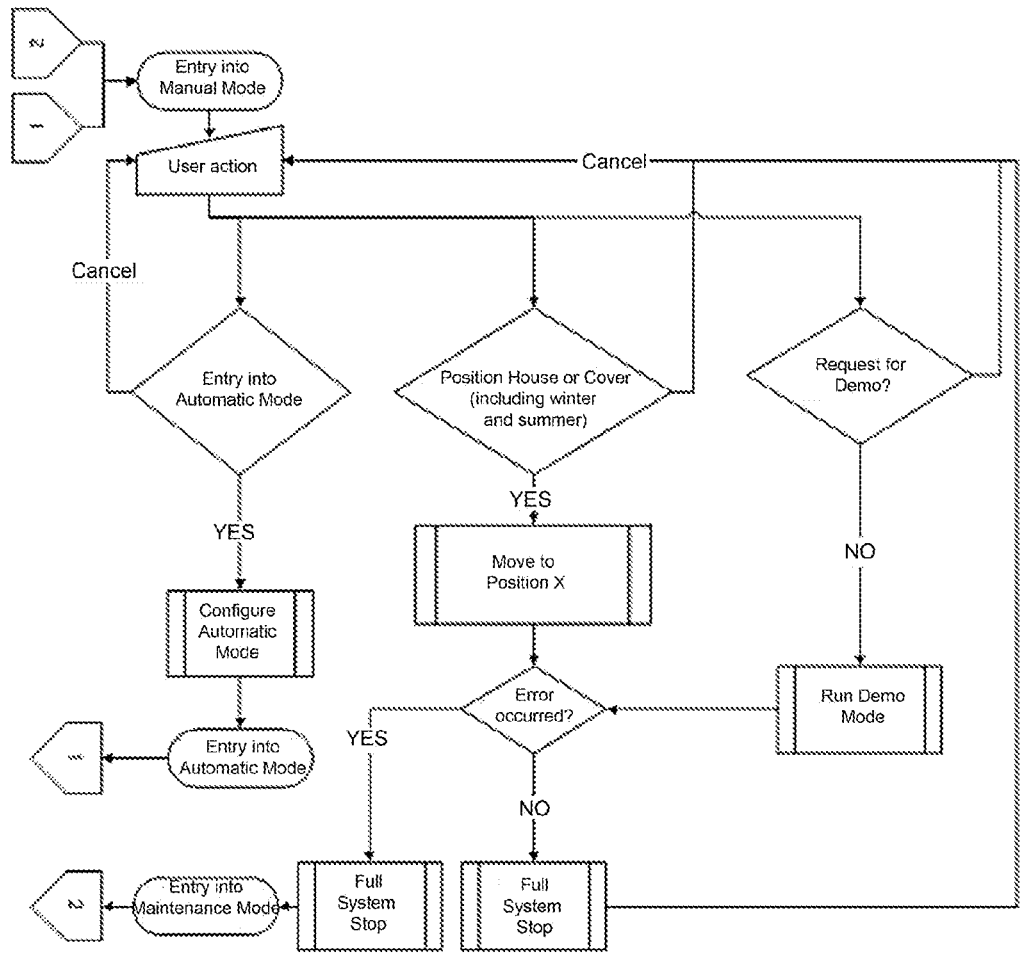
FIG. 12: Detail of the schematic representation of the operation of the automation system in manual mode.
Figure 13:
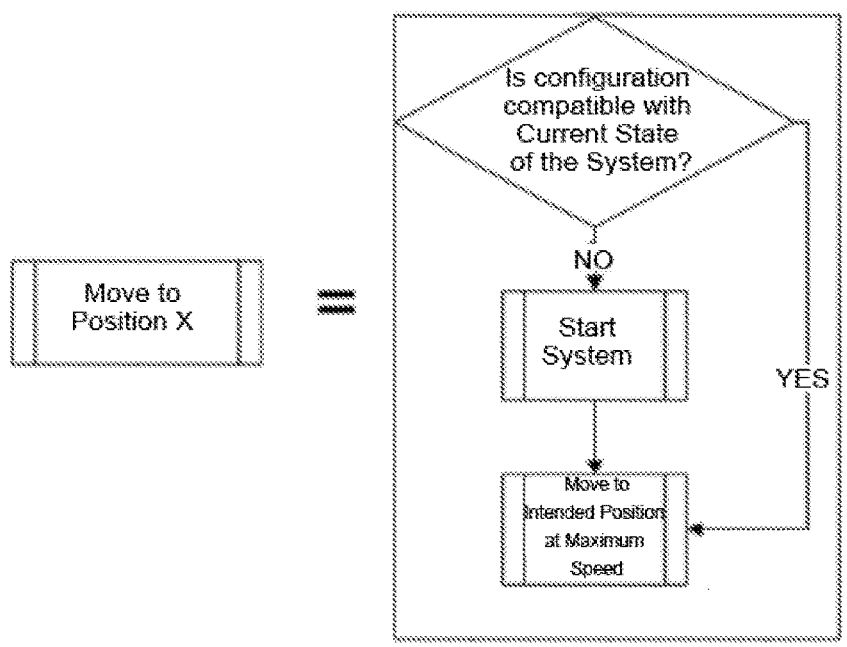
FIG. 13: Detail of the schematic representation of the operation of the automation system of a detail of the movement function to position X.
Figure 14:
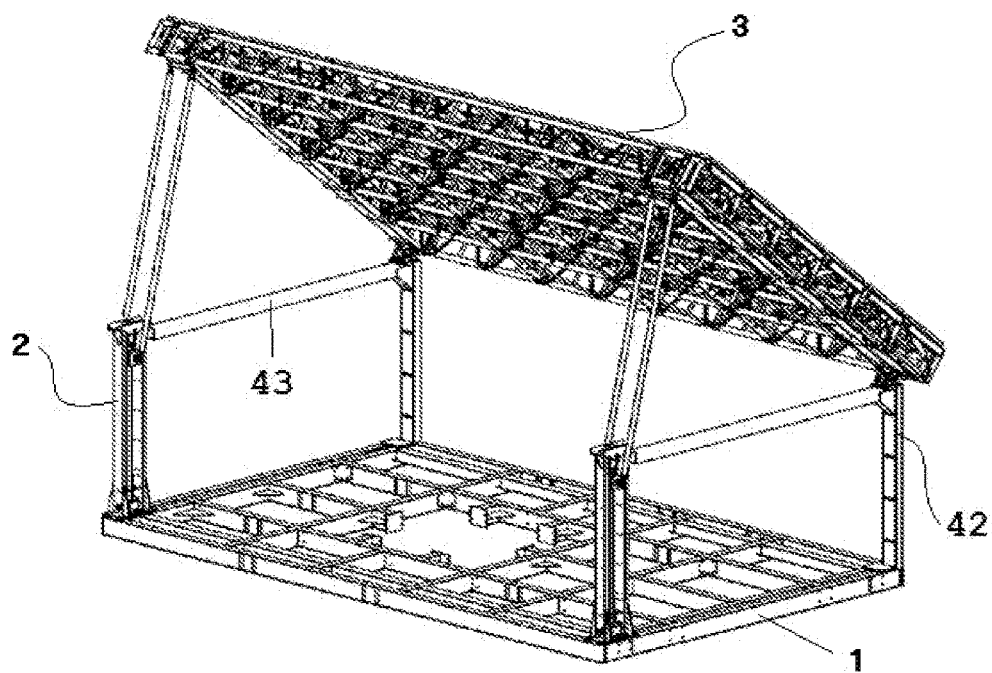
FIG. 14: Schematic representation of the structure, wherein the following reference numbers represent:
1—lower structure;
2—lifting mechanism;
3—upper structure without side sections;
42—pillar;
43—upper beams.
Figure 15:
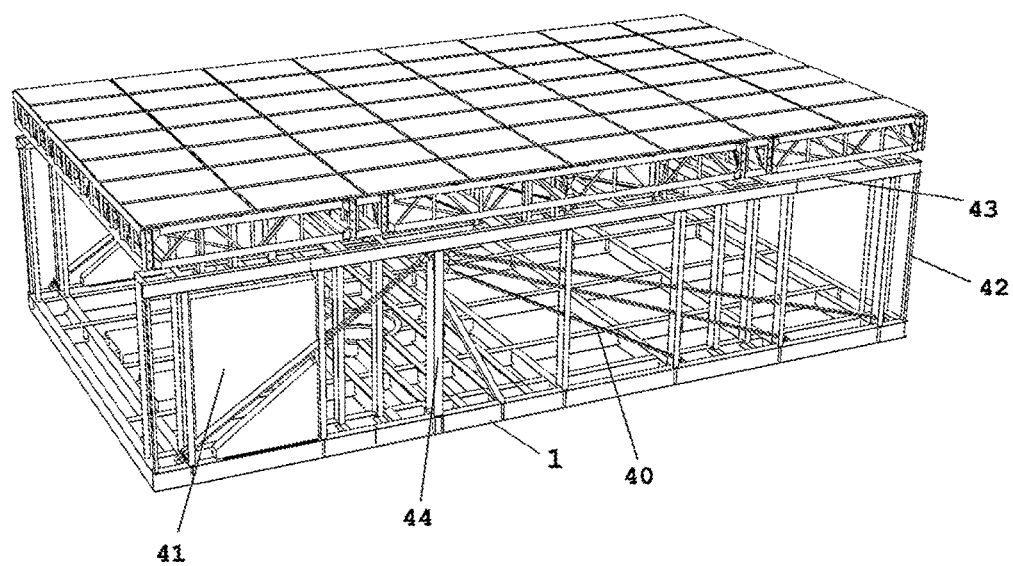
FIG. 15: Schematic representation of the automated structure in a perspective view having the upper structure in a closed position, wherein the following reference numbers represent:
1—lower structure;
40—cross member;
41—counter weights;
42—supporting pillars;
43—upper beams;
44—supporting pillars of cross member.
Figure 16:
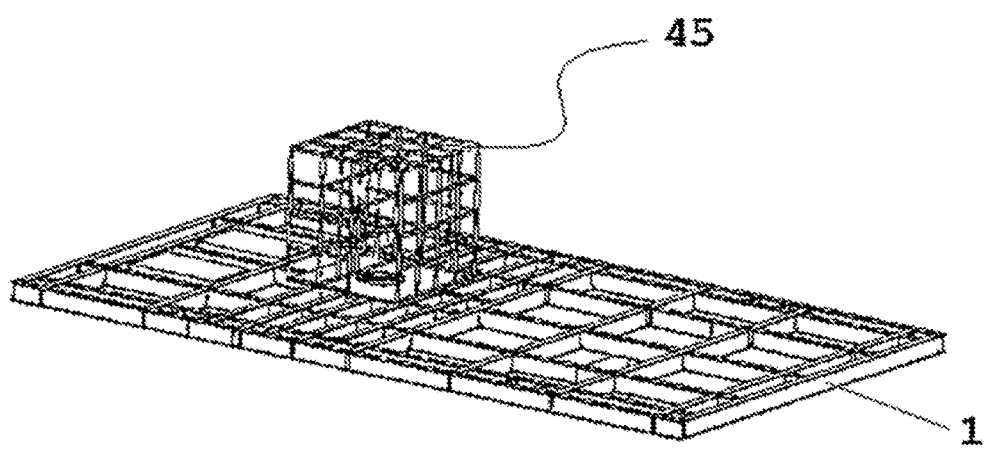
FIG. 16: Schematic representation of the structures wherein the following reference numbers represent:
1—lower structure;
45—fixed structure.
Figure 17:
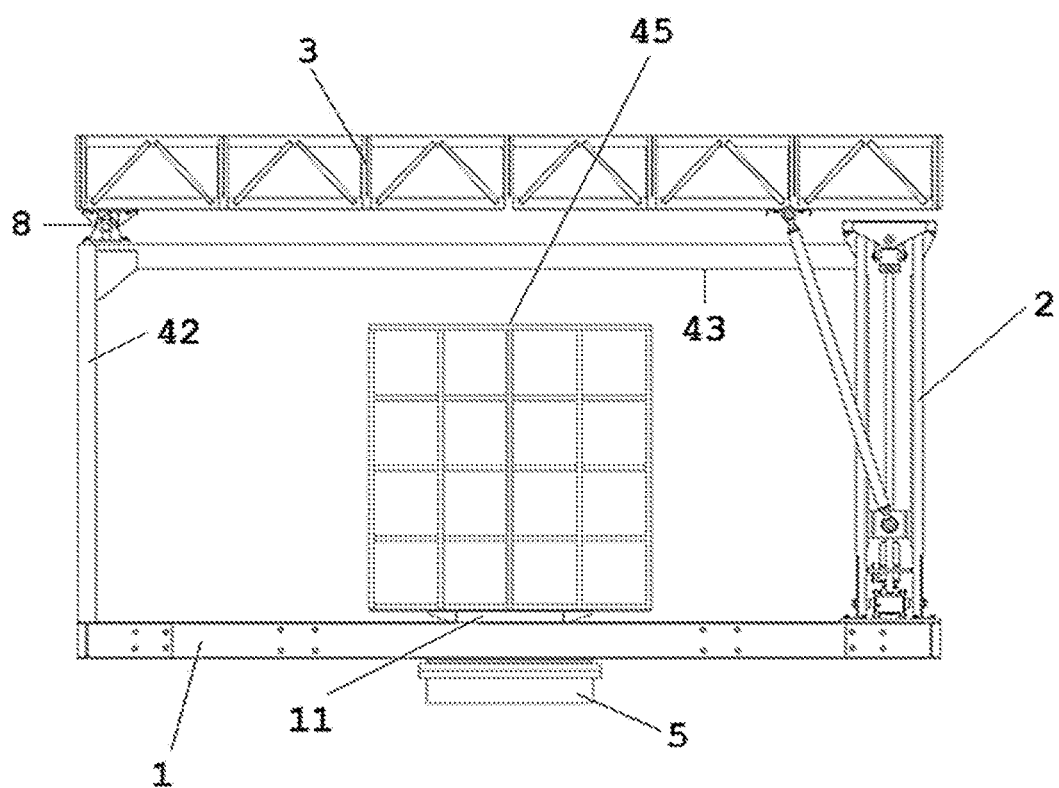
FIG. 17: Schematic representation of the automated structure having the upper structure in a closed position, wherein the following reference numbers represent:
1—lower structure;
2—lifting mechanism;
3—upper structure;
5—fixed shaft for attachment to the exterior;
8—upper bearing;
11—element of attachment of the shaft with the exterior;
42—supporting pillars;
43—upper beams;
45—fixed structure.

The automation system is based on a programmable automaton and a set of sensors and actuators, in particular an anemometer and frequency inverters that control the rotation motor (28) and the motor that operates the upper structure (14) as well as the motors (32 and 33) placed, respectively, in the lower (9) and upper (10) locks and that determine the a rotation axis of the upper structure (14) which may, for example, correspond to the summer or winter movements and by means of said lower (9) and upper (10) latches a set of limit switches of protection in particular the upper (8) and lower (7) bearings. The automation system illustrated by the flowchart in FIG. 10 uses a software developed in Ladder logic and designed so that each of the features that implements can be invoked by higher level systems such as computers, tablets or smartphones and has 3 modes of operation, which are now explained:

Mode 1: Automatic

In this mode, that will the usual mode of operation, the lower structure (1) and the upper structure (3) will move in such way as to obtain the maximum use of the solar energy. Depending on the intended configuration, the system allows lifting of only the upper structure (3), only rotate the entire structure or both movements combined. Similarly, in the context of this automatic mode, it is possible to configure whether the upper structure (3) executes a summer movement, in which the aim is to create shadow on the main façade, or a winter movement, in which the purpose is not to create shadow on the façade, while the upper structure (3) remains perpendicular to the sun's position; these movements are illustrated in FIGS. 1, 2, 14 and 16, respectively. These configurations can also be carried out in the manual mode through interaction with a programming graphical console. The motor movements are monitored by the variators and automaton so that any anomaly is immediately detected and leads to a stop of the system that will require human intervention.

By way of example, the two motors (14) that ensure the lifting of the upper structure (3) must move synchronously and any discrepancy, even if minimum will be detected and the system stops until the cause of the discrepancy is resolved. Alternatively, we can opt for just one motor (14) applied to a lifting mechanism (2) for lifting the upper structure (3), placed in the centre of the larger section. When the anemometer measures the wind speed above a predetermined value the automation system will collect the upper structure (3) and will close all the latches (8 and 9) through action on the motors (14, 32 and 33) in order to ensure the structural safety of the upper structure (3). Accordingly, the system enters the maintenance mode from which it will emerge if the condition that led to switch to this mode is no longer present. If an authorised user acts on the monitoring and programming graphical console and requests a change in configuration or a predetermined positioning for the house or façade, when in automatic mode, the system will change into manual mode.

The automatic movement is therefore done through the management by said automation system that takes into consideration variables such as the sunlight and the time of the day.

Mode 2: Manual

In the manual mode, the monitoring of the operation of the system can be carried out and its behaviour can be configured. There are a number of configurable positions for the lifting of the upper structure (3) and rotation of the chassis to which the user can give an order of positioning; the system will carry out all necessary checks and will position the lifting of the upper structure (3) or the rotation of the chassis, this at a speed faster than the one used in the automatic mode of solar tracking.

Mode 3: Maintenance

The system goes into maintenance mode whenever an error occurs or when the speed of the wind is above a predetermined value. If an error occurs the human intervention is mandatory and the resolving of the error will take the system into manual mode. In the case of the emergency procedure caused by high speed of the wind, the system will return to the automatic mode if after a period of time the situation is resolved.

Next, the axial movement and the movement of the upper structure (3) will be explained:

Axial Movement

The lower structure (1) contains an opening (4) for accommodation of a fixed shaft, comprised by the element of attachment of the shaft with the exterior (11), where, preferably, the structure (45) and the fixed shaft for attachment to the exterior (5) can be coupled, whereto in turn is coupled preferably the rotating mechanism (27) or other similar, and that, by action of the motor of the rotation mechanism (28) on the drive sprocket (29) and the pinions (30), by means of a chain (not shown) allows the axial movement of the whole structure up to at least a radius of 180°. In a preferred embodiment, the method of operation presents a lower structure (1) in its axial movement aided by the guiding wheels of the shaft (12) and by the set of supporting wheels of the lower structure (13). This last set, also preferred, is arranged in a circle around the entire fixed shaft (5) that moves in a trough placed on the ground (not shown).

Upper Structure (3)

Figure 2:
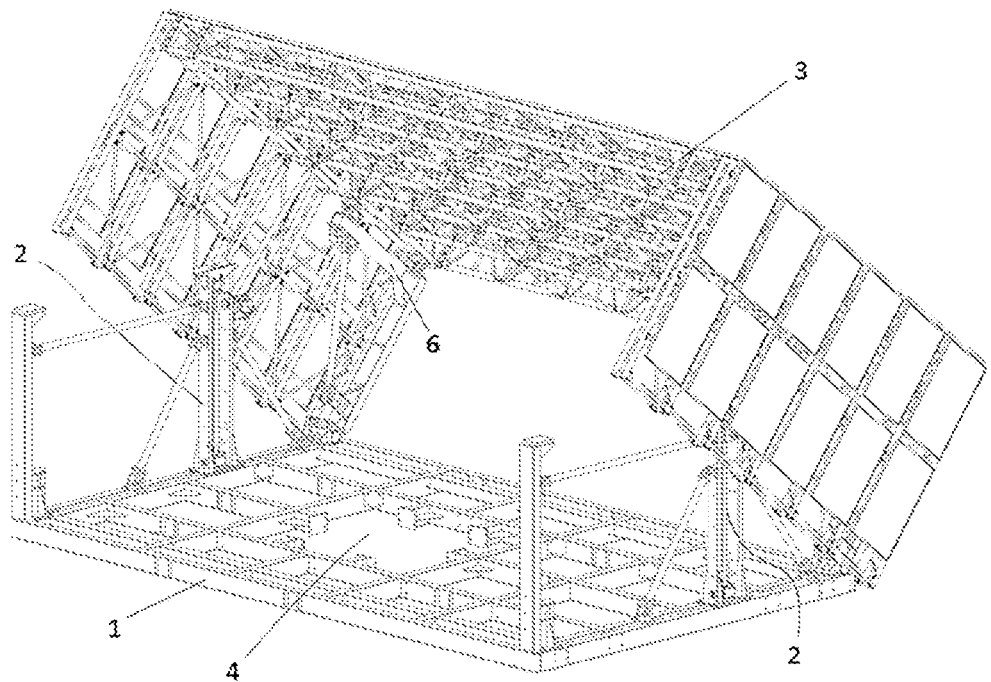
FIG. 2: Schematic representation of the structure with opening of the upper structure in the summer movement, wherein the following reference numbers represent:
1—lower structure;
2—lifting mechanism;
3—upper structure;
4—opening for accommodation of the shaft;
6—joint and support.
Figure 3:
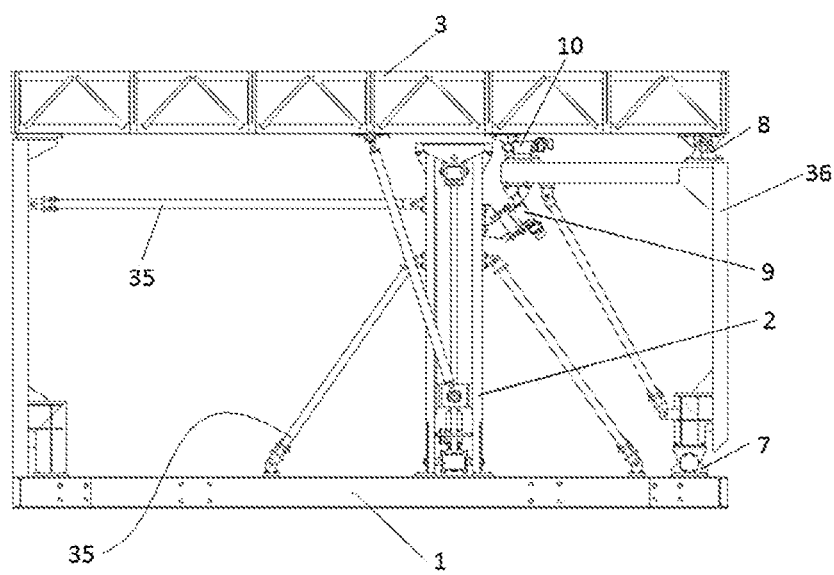
FIG. 3: Schematic representation of the structure with the upper structure in the closed position, wherein the following reference numbers represent:
1—lower structure;
2—lifting mechanism;
3—upper structure
7—lower bearing;
8—upper bearing;
9—lower latch;
10—upper latch;
35—support bars of the lifting mechanism;
36—support piece.
Figure 4:
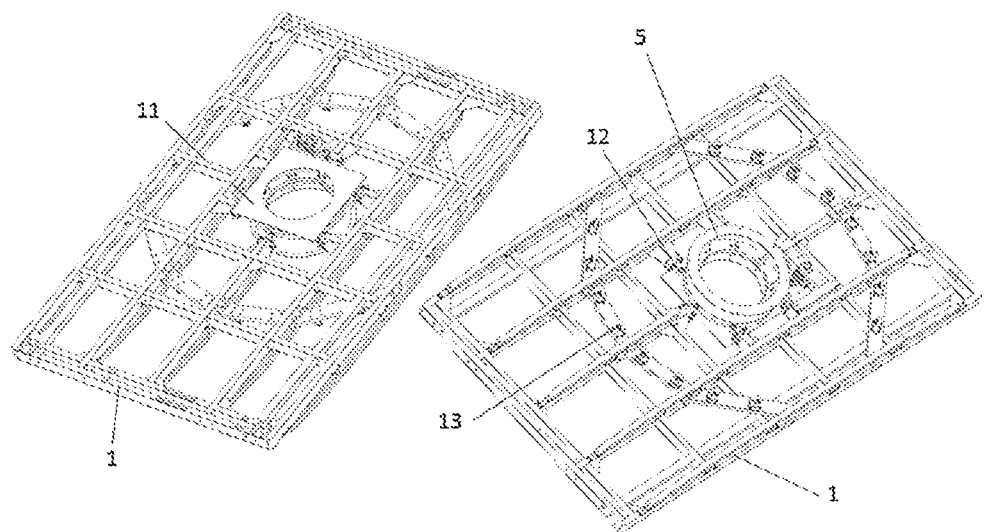
FIG. 4: Schematic representation of the lower and upper view of the lower structure, wherein the following reference numbers represent:
1—lower structure;
5—fixed shaft for attachment to the exterior;
11—element of attachment of the shaft with the exterior;
12—guiding wheels of the shaft;
13—set of supporting wheels of the lower structure.
Figure 5:
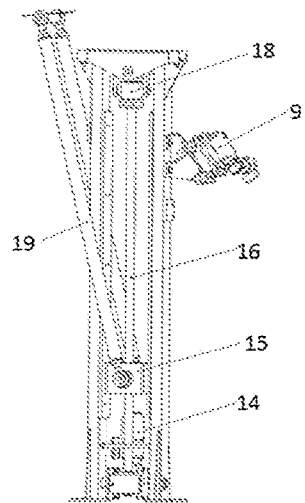
FIG. 5: Schematic representation of the lifting mechanism, wherein the following reference numbers represent:
9—lower latch;
14—electric motor to drive the upper structure;
15—driving nut;
16—driving spindle;
18—supporting sleeve of the driving spindle;
19—connecting rods of actuation of the upper structure.
Figure 6:
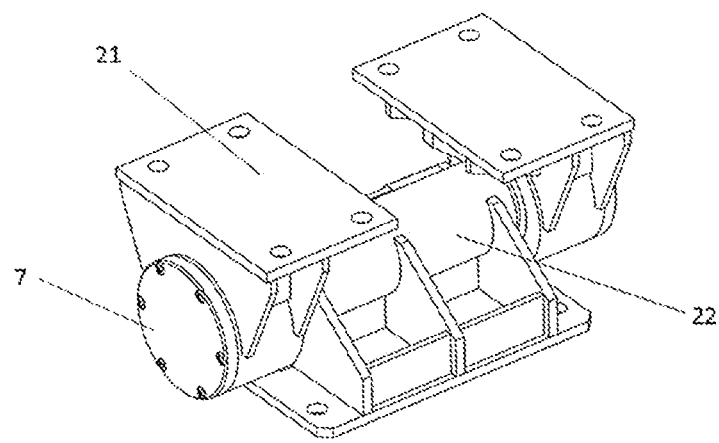
FIG. 6: Schematic representation of the lower bearing, wherein the following reference numbers represent:
7—lower bearing;
21—mobile element of the lower bearing;
22—fixed element of the lower bearing.
Figure 7:
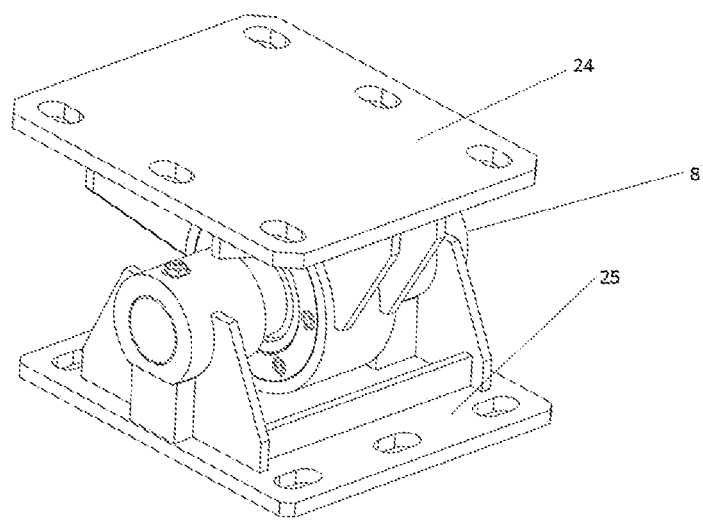
FIG. 7: Schematic representation of the upper bearing, wherein the following reference numbers represent:
8—upper bearing;
24—mobile element of the upper bearing;
25—fixed element of the upper bearing.
Figure 8:
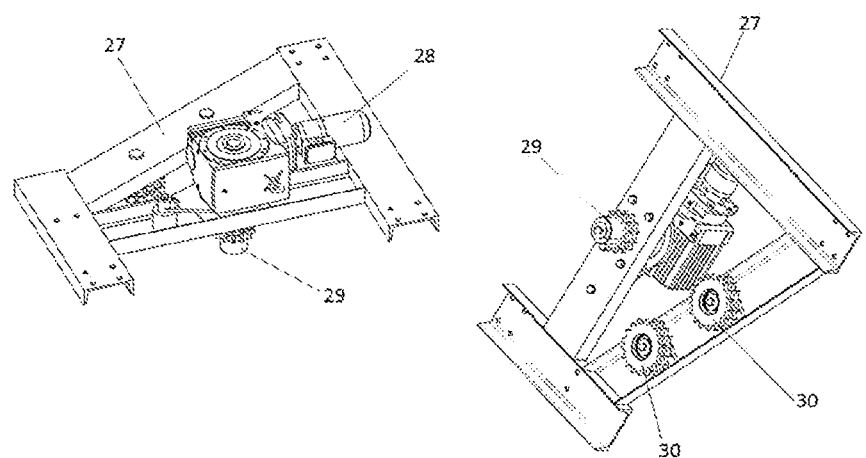
FIG. 8: Schematic representation of the rotating mechanism in the lower and upper views, wherein the following reference numbers represent:
27—rotating mechanism;
28—motor of the rotation mechanism;
29—drive sprocket;
30—pinions.
Figure 9:
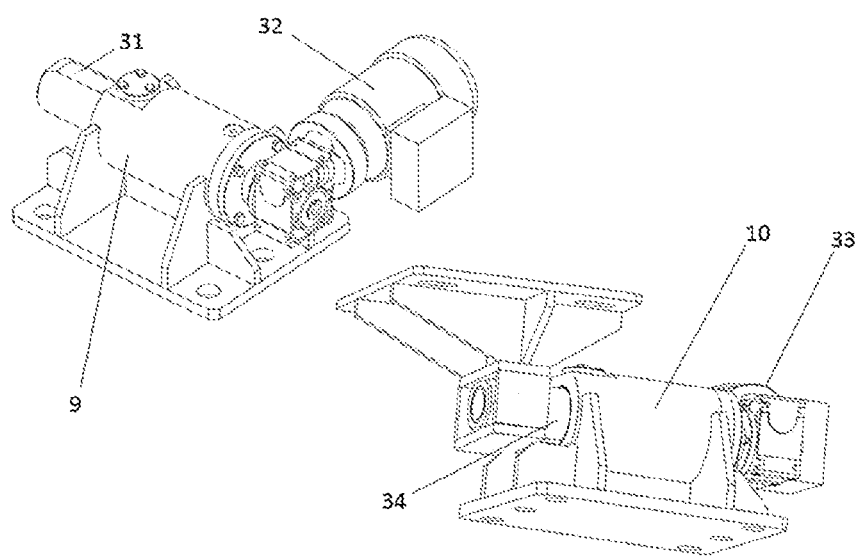
FIG. 9: Schematic representation of the latches, wherein the following reference numbers represent:
9—lower latch;
10—upper latch;
31—latching pin of the lower latch;
32—electric motor that operates the lower latch;
33—motor that operates the upper latch;
34—latching pin of the upper latch.

In order that the upper structure (3), starting from the opening position, such as shown in FIG. 1 (winter) or 2 (summer), can move in the closed position in FIG. 3 (up to approximately 14:00 hours) and return to the opened position (approximately 20:00 hours) in FIGS. 1 and 2, in accordance with the height of the sun and direction of its light, the automation system controls the electric motor that drives the upper structure (14), which drives the spindle (16) and, through the nut (15) and the connecting rods (19), which will lift the upper structure (3) since they are coupled to it. This movement implies that the lower latch (9) is unlocked, something that the automation system will do simultaneously by activating the electric motor that operates the lower latch (32) which, in turn, will activate the latching pin of the lower latch (31) keeping the upper latch (10) locked. In this movement, the lower bearing (7), through its fixed and mobile elements (22 and 21) serves as a shaft and support to the upper structure (3) to which it is connected by means of the support piece (36). This movement is specially useful in the summer, at sunrise and sunset, when the position of the sum is lower, therefore the inclination of the upper structure (3) must be greater, as shown in FIG. 2, and it can go up to a maximum of 90 degrees, creating private external spaces, however, in a preferred application, it can go up to 60 degrees, creating covered external spaces and shaded areas, measured from the lower bearing (7).

In the case of the so called winter movement, wherein the degree of inclination of the upper structure (3) needs not to be so great in order to keep the inside temperature of the modular construction adequate, the opening movement of the upper structure (3) only differs by the fact that the automation system commands the upper latch (10) to be unlocked by activating the electric motor that operates the upper latch (33) which activates the latching pin of the upper latch (34) keeping the lower latch (9) locked. In this case the upper bearing (8), by means of its fixed and mobile elements (25 and 24), serves as a shaft and upper structure (3) support in conjunction with a support piece (36). This movement has maximum amplitude of 60 degrees measured from the upper bearing (3) and it is specially useful in the winter, that is, when the position of the sun is lower, therefore the inclination of the upper structure (3) must be greater, as shown in FIG. 1, allowing the incidence of the sun on the façade which results in heating of the interior of the modular construction.

The movement of the upper structure (3) can also be carried out in the opposite direction to that presented in the figures, by modifying the direction of the connecting rods (19), displacing the lifting mechanism (2) to the centre of the side section and placing a duplication of the remaining elements responsible for the movement of the upper structure on the opposite side of the same section, in response to the needs of countries near the equator.

It should be noted that the supporting bars of the lifting mechanism (35) allow assisting the lifting mechanism (2) to withstand the forces exerted during the movements of opening and closing of the upper structure (3). The entire upper structure (3) is preferably produced in lattice format, thus allowing reduction of weight and increase of robustness.

In a preferred embodiment, the automated structure for reception of modular constructions can execute a 360° rotation.

In another preferred embodiment, the automated structure for reception of modular constructions can be programmed so that this modular construction, for example a house, executes a 180° movement according to the movement of the sun in that location and return to the starting point, making its return during the night.

Additionally, the mode of operation described above could be applied, with the necessary alterations, to a simpler structure with the aim of reducing production costs and in order to provide a more accessible product.

This way, the automated structure can be sized to allow only opening and closing movements of the upper structure (3), without side sections (46). In this case the lifting mechanism (2) will be positioned on one of the ends of the side sections of the lower structure (1), and a pillar (42), which contains an upper bearing (9) on its upper end in such way as to enable the articulation of the upper structure (43) without side sections (46), as well as an upper beam (43) as a support. To control the movements of opening and closing, the programmable automaton should act only on the electrical motor that drives the upper structure (14). The angle of inclination of the upper structure without side sections (3) remains the same as previously explained, however, the embodiment now described only allows the winter movement.

Furthermore, if necessary, for the purposes of project, to place the opening (4) for accommodation of a fixed shaft, comprised by the element of attachment of the shaft with the exterior (11) where preferably the structure (45) and the fixed shaft for attachment to the exterior (5) can be coupled at one of the ends of the lower structure (1), the automated structure should be rebalanced. To this end it is used the fixation of support pillars (42) at the side ends of the lower structure (1), which connect the upper beams (43) and cross members (40) coupled to supporting pillars of cross members (44). Further, counter weights (41) are applied at each end of the shorter side of the lower structure (1) in order to ensure the balance of the entire automated structure, thus eliminating the supporting wheels of the structure (13), the guiding wheels of the shaft (12) being able to be replaced by a solution similar to the crane system or other.

The following claims additionally emphasise particular embodiments of the invention.

The invention claimed is:

1. An automated structure for reception of modular constructions, the automated structure comprising:
   a first structure comprising an opening adapted to fit around a fixed shaft, a plurality of wheels arranged in a circle around the opening, a first side section and a second side section;
   a first lifting mechanism disposed on the first side section of the first structure;
   a second lifting mechanism disposed on the second side section of the first structure;
   a second structure disposed above the first structure, the second structure being coupled to the first and second lifting mechanisms, wherein the first and second lifting mechanisms are adapted to cause the second structure to move from a first, closed, position to a second, open, position relative to the first structure;
   wherein the first and second structures define and at least partially enclose a volume adapted to hold a modular structure when the second structure is in the first, closed, position relative to the first structure;
   a first locking mechanism comprising a first latch;
   a second locking mechanism comprising a second latch; and
   an anemometer.

2. The automated structure according to claim 1, further comprising a connecting element adapted to enable attachment of the automated structure to the fixed shaft.

3. The automated structure according to claim 1, further comprising one or more motors adapted to control movement of the first and second structures.

4. The automated structure according to claim 1, wherein the second structure comprises a lattice format.

5. An automation system attached to the automated structure of claim 1, comprising a programmable automaton and a plurality of sensors adapted to control movements of the automated structure.

6. The automation system according to claim 5, wherein the automation system comprises three modes of operation including an automatic mode in which the first and second structure move in order to obtain maximum use of solar energy, a manual mode in which a user causes the first and second structures to move, and a maintenance mode that is triggered when an error occurs or when a wind speed above a predetermined value is detected.

7. The automation system according to claim 5, wherein the automation system is adapted to cause the second structure to move to the first, closed, position relative to the first structure when a wind speed above a predetermined value is detected.

8. The automation system according to claim 6, further comprising:
- a processing device; and
- software implemented on the processing device, the software adapted to control movements of the first and second structures and to cause the automation system to switch from a first mode of operation among the three modes of operation to a second mode of operation among the three modes of operation, wherein the processing device is one of a computer, a tablet and a smartphone.

9. An automated structure for reception of modular constructions, the automated structure comprising:
- a first structure comprising an opening adapted to fit around a fixed shaft, a plurality of wheels arranged in a circle around the opening, a first side section and a second side section;
- a first lifting mechanism disposed on the first side section of the first structure;
- a second lifting mechanism disposed on the second side section of the first structure;
- a second structure disposed above the first structure, the second structure being coupled to the first and second lifting mechanisms, wherein the first and second lifting mechanisms are adapted to cause the second structure to move from a first, closed, position to a second, open, position relative to the first structure;
- wherein the first and second structures define and at least partially enclose a volume adapted to hold a modular structure when the second structure is in the first, closed, position relative to the first structure;
- an automation system comprising:
  - a programmable automaton;
  - a plurality of sensors comprising:
    - an anemometer;
  - a plurality of operating modes comprising:
    - an automatic mode in which the first and second structure move in order to obtain maximum use of solar energy;
    - a manual mode in which a user causes the first and second structures to move; and
    - a maintenance mode that is triggered when an error occurs or when a wind speed above a predetermined value is detected, wherein
  - the second structure is adapted to move to the first, closed, position relative to the first structure when a wind speed above the predetermined value is detected;
- a processing device; and
- software implemented on the processing device, the software adapted to control movements of the first and second structures and to cause the automation system to switch from a first mode of operation among the three modes of operation to a second mode of operation among the three modes of operation, wherein the processing device is one of a computer, a tablet and a smartphone.

* * * * *